UNITED STATES PATENT OFFICE.

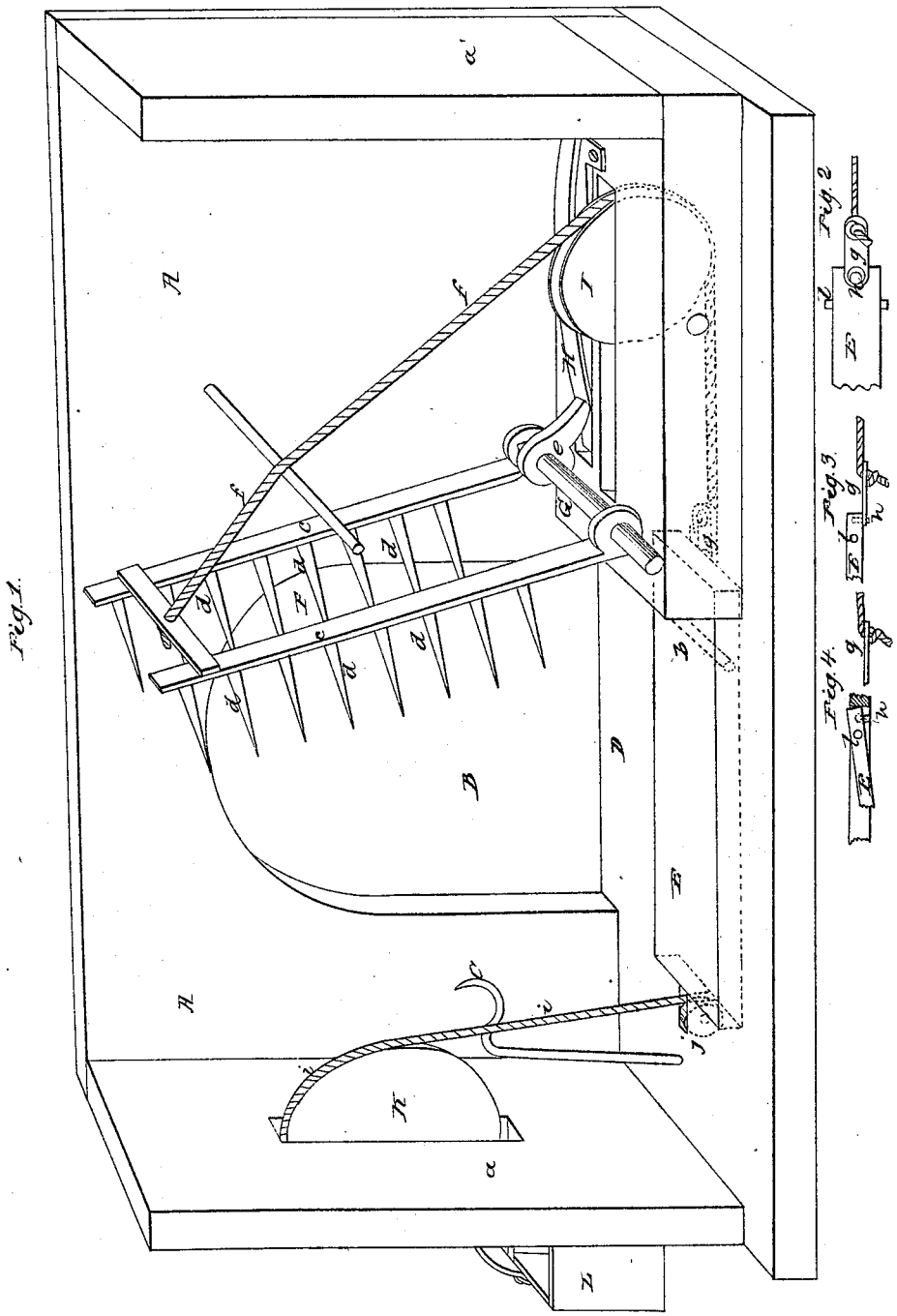

JAMES THOMAS, OF WEST CHESTER, PENNSYLVANIA.

ADJUSTABLE PLATFORM FOR ANIMAL-TRAPS.

Specification of Letters Patent No. 6,554, dated June 26, 1849.

*To all whom it may concern:*

Be it known that I, JAMES THOMAS, of West Chester, in the county of Chester and State of Pennsylvania, have invented a new and Improved Trap for the Destruction of Animals, Particularly those of a Predatory Disposition, such as the Ground Hog, Fox, &c., of which the following is a full, clear and exact description, reference being had to the accompanying drawing, in which—

Figure 1 represents a perspective view of the trap, the side toward the spectator, and the top being removed. Figs 2, 3, and 4 are various views of the arrangement for discharging the trap.

My invention and improvement consists in constructing a trap with an adjustable counterpoise, whereby it can be adapted to catching large or small animals, and when large animals alone are to be caught it can be adjusted so as to prevent its being discharged by the weight of smaller ones passing over it.

The various members of my trap are attached to a box or case A of which for the sake of convenience in describing I shall call the end $a$ the front, and $a'$ the hind end. Each side of the box is pierced near its front end with an opening or door B, for the entrance of the animal, the two entrances being opposite each other. The bait is attached to a hook C. In the bottom D of the box, immediately between the two entrances, an opening is made to which is fitted a lever platform E, turning near its hind or extremity upon an axis $h$ by which it is attached to the box.

The apparatus for securing the animal is concealed in that portion of the box lying between the entrance B and hind end $a'$ and consists of a rectangular frame F composed of strips of wood or metal, the side ones $c$ being parallel with and nearly touching the sides of the box; to these side strips, spikes $d$ are attached, which on the descent of the frame pierce the animal entering the doors. The frame F is hinged at its hind extremity to the box A by a rod G which forms the back strip of the frame F and on which the whole frame turns like a trap door on its hinges. On this rod is keyed a cam $e$, on the lower face of which acts the front extremity of the spring H its hind extremity being attached to the box A. When the trap is set, the spiked frame is raised to nearly a vertical position as represented in Fig. 1 from which it tends to descend by the action of the spring (H) upon the cam $(e)$. In order to hold it in this position a cord $f$ is attached to its outer or front end, this cord passes backward over the pulley wheel I in the bottom of the box, and is thence brought forward under the bottom and connected with the hind extremity of the lever platform E. This connection must be so arranged that when the front extremity of the platform is depressed by the weight of the animal the cord will be detached and the spiked frame allowed to descend. To accomplish this object I attach to the lower end of the cord $f$ a link $g$ (Figs. 2, 3, and 4), one extremity of this link is secured to the cord, the opposite extremity catches on the lower end of a pin $h$ inserted in the bottom of the hind extremity of the platform E; when the upper surface of the platform coincides with the upper surface of the floor of the box, A, this pin slightly projects below the bottom of the floor immediately adjoining the hind extremity of the platform, and the link $g$ can be caught upon it (Figs. 2 and 3); if now the pin is raised (Fig. 4) by the depression of the front extremity of the platform, it is disengaged from the link (which is prevented from rising with the pin by the bottom of the box) and the spiked frame descends upon, and transfixes the the animal entering the doors in quest of bait. To the front end of the platform E I attach a cord $i$ which passes upward and over the pulley K in the front end of the box; to its opposite end is attached a counterpoise L, the weight of which can be adjusted accurately to the weight of the tread of the animal intended to be caught. This counterpoise consists of a small bucket or box into which any convenient substance may be placed to give it the required weight. A pulley $(j)$ is placed in the slot in the bottom of the trap through which the cord $(i)$ passes, and instead of attaching the cord $i$ to the bottom of the platform E so that the weight of the counterpoise shall prevent the trap from springing by the weight of a small animal it may be attached to the top of the platform E and carried downward round the pulley, and returned upward as in the first case, so that the weight of the counterpoise L shall assist in springing the trap when it is set for a small animal.

What I claim as my invention, and desire to secure by Letters Patent, is—

1. The combination of the spring spiked frame (F) and adjustable platform (E) made, arranged, and connected in the manner and for the purpose herein set forth.

2. I likewise claim the combination of the hinged platform (E) with the counterpoise (L) for adjusting the platform so as to make the trap go off with more or less force, thus adapting it to animals of different sizes.

JAMES THOMAS.

Witnesses:
 JOHN T. HAINES,
 PASCHALL WOODWARD.